United States Patent
Cohen et al.

(10) Patent No.: US 7,581,674 B2
(45) Date of Patent: Sep. 1, 2009

(54) FINANCIAL TRANSACTION SYSTEM AND METHOD

(76) Inventors: Charles Cohen, 323 S. Doheny Dr., Suite 103, Los Angeles, CA (US) 90048; Jean-Pierre Murray, 1017 N. Beverly Dr., Beverly Hills, CA (US) 90210

(*) Notice: Subject to any disclaimer, the term of this patent is extended or adjusted under 35 U.S.C. 154(b) by 401 days.

(21) Appl. No.: 10/993,749

(22) Filed: Nov. 19, 2004

(65) Prior Publication Data

US 2005/0116028 A1 Jun. 2, 2005

Related U.S. Application Data

(60) Provisional application No. 60/524,419, filed on Nov. 21, 2003.

(51) Int. Cl.
*G06K 5/00* (2006.01)
*G06Q 40/00* (2006.01)

(52) U.S. Cl. .................. 235/380; 705/35; 705/39; 235/379

(58) Field of Classification Search .......... 235/380, 235/375, 379; 705/35–45
See application file for complete search history.

(56) References Cited

U.S. PATENT DOCUMENTS

| | | | | |
|---|---|---|---|---|
| 4,877,947 A | 10/1989 | Mori | | 235/381 |
| 5,513,250 A | 4/1996 | McAllister | | 379/91 |
| 5,869,825 A | 2/1999 | Ziarno | | 235/380 |
| 6,085,168 A | 7/2000 | Mori et al. | | 705/17 |
| 6,473,500 B1 | 10/2002 | Risafi et al. | | |
| 6,488,203 B1 | 12/2002 | Stoutenburg et al. | | 235/379 |
| 6,615,189 B1 | 9/2003 | Phillips et al. | | |
| 6,625,438 B2 | 9/2003 | Hanson | | |
| 6,629,080 B1 | 9/2003 | Kolls | | |
| 6,814,282 B2 | 11/2004 | Seifert et al. | | 235/379 |
| 2002/0077973 A1 | 6/2002 | Ronchi et al. | | 705/39 |
| 2002/0091632 A1 | 7/2002 | Turock et al. | | 705/39 |
| 2002/0104878 A1 | 8/2002 | Seifert et al. | | 235/379 |
| 2002/0120563 A1 | 8/2002 | McWilliam et al. | | 705/39 |
| 2003/0053609 A1 | 3/2003 | Risafi et al. | | 379/114.2 |

(Continued)

FOREIGN PATENT DOCUMENTS

WO WO 02/086676 10/2002

OTHER PUBLICATIONS

Ikobo Money Transfer and Merchant Services, *The Fastest Growing Money Transfer Company*, web site http://www.ikobo.com, p. 1, (Mar. 18, 2005—retrieval date).

(Continued)

*Primary Examiner*—Daniel A Hess
(74) *Attorney, Agent, or Firm*—David Aker

(57) ABSTRACT

A financial system and method for a stored value e-card financial management system using a worldwide financial network to deposit funds into an e-card account in one country and withdraw funds from a networked automated teller machine in another country. A dual-card package containing two e-cards and a personal identification number is purchased at a point-of-sale location, and then activated by depositing funds into the e-card system. A first load-card is used for activating and reloading the e-card system, and a second debit-card provides withdrawal capabilities when the account balance is sufficient to fund the request and any associated fees.

25 Claims, 6 Drawing Sheets

U.S. PATENT DOCUMENTS

2005/0086168 A1* 4/2005 Alvarez et al. ............... 705/41

OTHER PUBLICATIONS

Networld Alliance LLC, *New Citibank ATM card facilitates money transfer to Mexico*, web site http://www.atmmarketplace.com/news_printable.htm?id=13173, p. 1, Jul. 31, 2002.

Next Estate Communications, Inc., *Prepaid MasterCard Card-Customer Service*, web site, https://www/mymccard.com/a/english/index.aspx, pp. 1-3, (Mar. 18, 2005—retrieval date).

Global Card International, LLC, *Home Page*, web site, http://www.globalcard.us, pp. 1-2, (Mar. 18, 2005—retrieval date).

The Associated Press, *Cashless Society Gets Mixed Reviews*, CNN.com/TECHNOLOGY, Feb. 8, 2003, pp. 1-3, www.cnn.com/2003/TECH/ptech/02/08/cash.smart.ap/.

Mentions Legales, *Moneo: la carte des petites depenses quotidiennes*, MONEO.net, p. 1, www.moneo.net/index.htm, Feb. 25, 2005.

* cited by examiner

FINANCIAL TRANSACTION SYSTEM AND METHOD

CROSS-REFERENCES TO RELATED APPLICATIONS

This application claims the benefit of U.S. Provisional Application Ser. No. 60/524,419, filed Nov. 21, 2003, the content of which is hereby incorporated herein by reference.

FIELD OF THE INVENTION

This invention relates to a system for performing e-commerce financial transactions with an electronic debit card, which can be activated and repeatedly increased in stored value at a first location and used to perform debit transactions at a second location.

BACKGROUND OF THE INVENTION

The growth of the Internet has created a new way to buy, sell, trade, and barter foods and services worldwide. This new form of buying, selling, trading, and bartering may commonly be referred to as electronic commerce or e-commerce. Electronic banking has also created new ways to conduct financial transactions both regionally and worldwide. The process of conducting these types of transactions can be called an electronic commerce transaction or e-commerce transaction.

Credit cards have been in existence for a relatively long time. Retail stores initially issued these cards for use in the store or chain of stores. The store extends credit to a customer to purchase items and requires payment at the end of a billing period. Credit card processing networks exist, allowing consumers to use one credit card to shop at a variety of merchants. With this type of card, a card issuer, such as a bank, extends credit to a consumer to purchase products or services. When a consumer makes a purchase from an approved merchant, the card number and amount of the purchase, along with other relevant information, are transmitted via the processing network to a processing center which verifies that the card has not been reported lost or stolen and that the card's credit limit has not been exceeded. In some cases, the consumer's signature is also verified. The consumer is required to repay the bank for the purchases, generally on a monthly basis. Typically, if the bank is not fully repaid by the due date, the consumer incurs a finance charge. The card issuer may also charge an annual fee.

Debit cards are also currently in use. They are typically linked to the cardholder's existing deposit account at a bank. There are generally two types of debit cards: "on-line" and "off-line." When a consumer makes a purchase using an on-line debit card, the consumer inputs a personal identification number ("PIN") to a terminal that is connected to a central processing center over a network. The center verifies the card number and PIN during the transaction, and the linked deposit account is immediately debited the amount of the purchase. When a purchase is made using an off-line debit card, and there is no connection to a central processing center, the customer's signature is typically used to verify the identity of the cardholder in much the same way as is done with credit cards. The information is later sent to a central processing center or directly to the relevant bank. A PIN may also be used in conjunction with off-line debit cards.

Another type of consumer card is a prepaid card. A consumer purchases the card for a particular amount of money. The cash value of the card is typically stored in either of two ways. The value can be indicated by data stored in the memory of the card. Alternatively, in a card having a magnetic stripe or in some cards having an integrated circuit ("IC") on them, value is indicated by data stored in a central host, which can be accessed using information stored on a magnetic stripe on the back of the card. Verification of the identity of the purchaser of the card is typically not required. With either an IC-type card or a magnetic stripe-type prepaid card, value is preloaded before a purchase is made. In addition, individual users of prepaid cards typically have no demand deposit account ("DDA") relationship with the financial institution that holds the prepaid card funds. When a consumer uses a prepaid card to make a purchase, the data indicating the value currently associated with the card is decreased by the amount of the purchase and any fees, if applicable. If the prepaid cards are not linked to a central host, the value indicated on the card will typically be unrecoverable if the card is lost.

Prepaid cards have been issued in association with particular merchants. These cards can be used only when purchasing goods or services from that particular merchant, similar to the limited usage associated with store credit cards. The cards are typically available in preset denominations (e.g., $10, $50, $100) and may or may not be activated before they are shipped to the store. If pre-activated and stolen, a card could be used immediately to make purchases before the theft was discovered. At any time after a customer purchases this type of card from a particular merchant, the card can be used to buy goods or services from that merchant or other merchants honoring the same card. The purchase process typically operates as follows. The cardholder presents the card for payment. The store attendant verifies the card number through a terminal which communicates with a store network and causes a debit of the amount of the purchase to the account associated with the card. When the card's value is depleted, the card is typically discarded.

On many occasions, consumers, bank customers, credit card holders and others find it desirable to arrange for another person, perhaps a relative, to have access to a specified sum of money. For example, a parent might want to arrange for a child to have access to money when the child is taking a vacation or going away for college. One may also find it desirable to mail a gift to another person who is geographically distant. According to a published study, in 2001, immigrants in the United States sent $23 billion abroad to Latin America and the Caribbean. In these and other cases, it is often undesirable to give away or send cash. If lost or stolen, cash is practically unrecoverable. Bank fund transfers, or other familiar financial wiring processes, can be costly and inconvenient.

The flow of remittances to the regions poorest countries are most often sent by persons who are un-banked immigrants. Millions of dollars of monthly money orders, averaging $200 each, generate more than $9.3 billion a year for Mexico. It is estimated that the annual cash flow to Latin America could be increased by $4 billion or more by reducing the transaction cost associated with sending money abroad.

While e-commerce continues to grow in popularity among banking consumers, the un-banked community has yet to realize the benefits of convenience and flexibility that e-commerce provides. Approximately thirty million people who reside in the United States do not have a bank account. This group of un-banked people includes people who have bad credit, a prior bankruptcy, low income and those who simply decide not to participate in the mainstream financial markets.

What has been needed is a financial system providing the benefits of e-commerce use to those people that would otherwise not have access to the fast evolving e-commerce financial systems of today. The present invention meets these and other needs.

SUMMARY OF THE INVENTION

Briefly and in general terms, the present invention is embodied in a financial system and method for a stored value e-card financial management system using a worldwide financial network to deposit funds into an e-card account in one country and withdraw funds from an automated teller machine (ATM) or other cash source in another country.

The stored value e-card financial system of the present invention includes an e-card financial management network, the e-card network having cash source systems connected in one or more countries within the legal framework of the banking laws of those countries. A dual-card package is purchased at a point-of-purchase (P.O.P) location, wherein the dual-card package contains a first transaction (load) e-card, a second transaction (debit) e-card and a personal identification number (PIN) that may be revealed by a scratch-off device or similar security mechanism. The load-card is configured to activate the stored value e-card system with cash deposits at the point-of-sale location. The debit-card is configured to allow cash withdrawals from the stored value e-card system at cash source systems in multiple countries. The stored value e-card system is reloadable by a load-card user for continuous use.

In the stored value e-card system of the present invention, the load-card is operable only in the country of activation ("activation country"), and the debit-card is not operable in the activation country (i.e., operable only in a "non-activation country"). To withdraw funds from the stored value e-card system, the debit-card is forwarded to a second e-card user. The PIN is communicated to the user of the debit-card for cash withdrawals at a networked cash source in a non-activation country. The second e-card user uses the personal identification number and the debit-card for automated teller machine cash withdrawals when the e-card system balance is sufficient to support the cash withdrawal and the assessed fees. The load-card user reloads the e-card stored value using the first transaction e-card and the personal identification number at a networked point-of-purchase (P.O.P.) location in the activation country. An optional aspect of the present invention provides for configuring the e-card system such that the load-card user and the debit-card user need provide little or no identification to the e-card system, wherein such financial systems are in accordance laws of the relevant countries.

The present invention includes a method for activating a dual-card e-card system for cash withdrawals in a foreign country using an e-card financial management system having networked point-of-sale locations and cash source systems in at least two countries. The method further includes purchasing a dual-card package having a load-card, a debit-card, and a personal identification number operable within one or more networked automated teller machine systems. The dual-card package may be purchased at a point-of-sale location. The load-card user may activate the e-card system at the point-of-sale location by depositing cash to an agent for adding stored value to the e-card.

The load-card user may allow another to withdraw funds from the e-card system by forwarding the second transaction e-card to a debit-card user, communicating the personal identification number to the debit-card user for use with the debit-card for withdrawing cash at a networked automated teller machine. Cash withdrawals are accomplished in a country that is not the same as the country of activation, so long as the e-card system account balance associated with the load-card and the debit-card is sufficient to support the requested amount and any assessed fees.

In an alternative embodiment of the present invention, a method for activating a dual-card e-card system provides safeguards in accordance with the prevailing banking laws and anti-terrorist financing regulations by verifying the identity of an e-card account holder prior to permanent activation of the e-card account. The method for activating the e-card system for cash withdrawals in a foreign country using an e-card financial management network includes a step requiring the e-card purchaser or load card user to contact the card center or e-card system customer service representative to provide purchaser identification information that may be required from all customers opening an account at a financial institution. The e-card issuer verifies the identity of the person seeking to open an account by purchasing an e-card. The issuer maintains records of the information used to verify a person's identity, including name, address, and other identifying information, and consults lists of known or suspected terrorists or terrorist organizations provided to financial institutions by the government to determine whether a person seeking to open an account appears on such list. The identification information provided by the load card user may include: the e-card provisional account code; name; address; phone number; and at least one form of government identification including social security number, passport, matricula consular, or drivers license.

When the load card user's identification is verified, the e-card issuer permanently activates the e-card system account and request the issuance of additional full service premium e-cards or bank cards. The premium bank cards will carry the VISA/MasterCard marks along with global automated teller machine and P.O.P. marks. If the identification verification is declined, then the e-card issuer will mail a check to the e-card purchaser for the amount of the initial load.

Other features and advantages of the present invention will become apparent from the following detailed description, taken in conjunction with the accompanying drawings, which illustrate, by way of example, the principles of the invention.

DETAILED DESCRIPTION OF THE INVENTION

In general, the present invention is directed to a financial system and method for a stored value e-card financial management system using a worldwide financial network to deposit funds into an e-card account in one country and withdraw funds from an automated teller machine (ATM) in another country.

Figure 1:
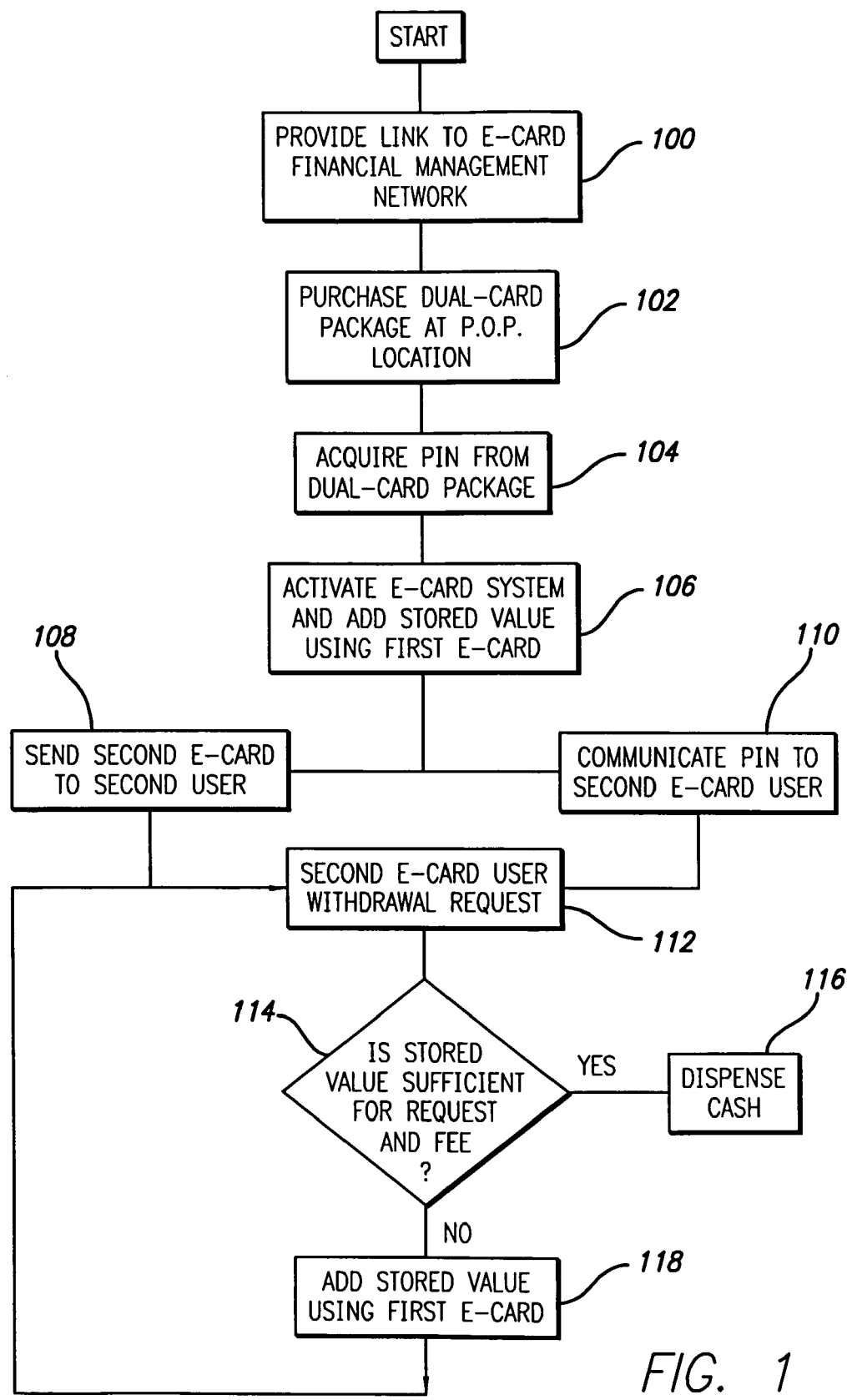
FIG. 1 is a flow diagram of an e-card financial management system of the present invention.
Figure 2:
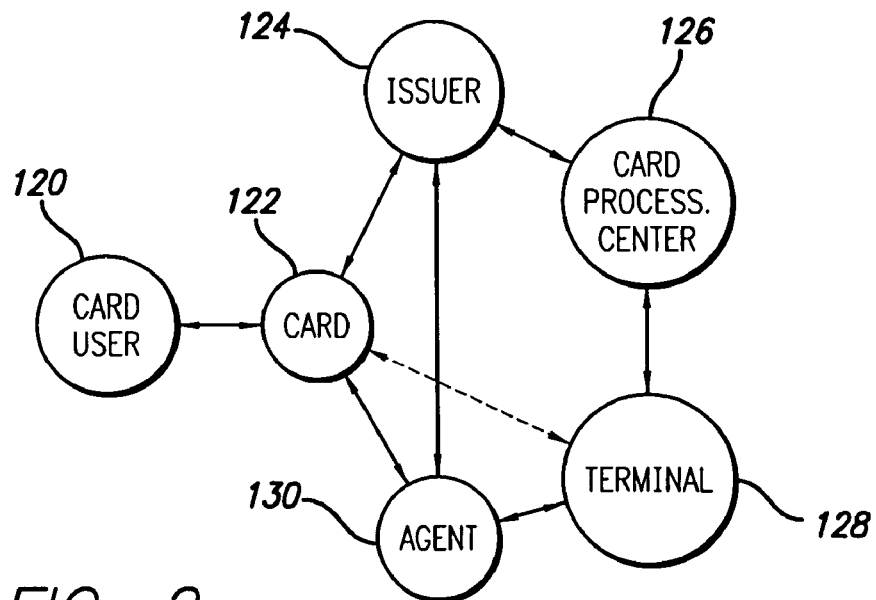
FIG. 2 is a schematic representation of an e-card financial management system of the present invention.

Referring now to the drawings for purposes of illustration and particularly to FIGS. 1 and 2, the stored value e-card system of the present invention includes an e-card packaged in a dual-card package 22 (FIG. 5) with a personal identification number (PIN) included in the package, for example, as a scratch-off. Each pair of e-cards 20 (FIG. 6) is manufactured with a unique PIN encoded in a magnetic strip on the card that is not changeable. Two e-cards are provided in the package 22, a first transaction load-card configured for depositing or adding stored cash value to the e-card system, and a second transaction debit-card used to withdraw cash.

Figure 3:
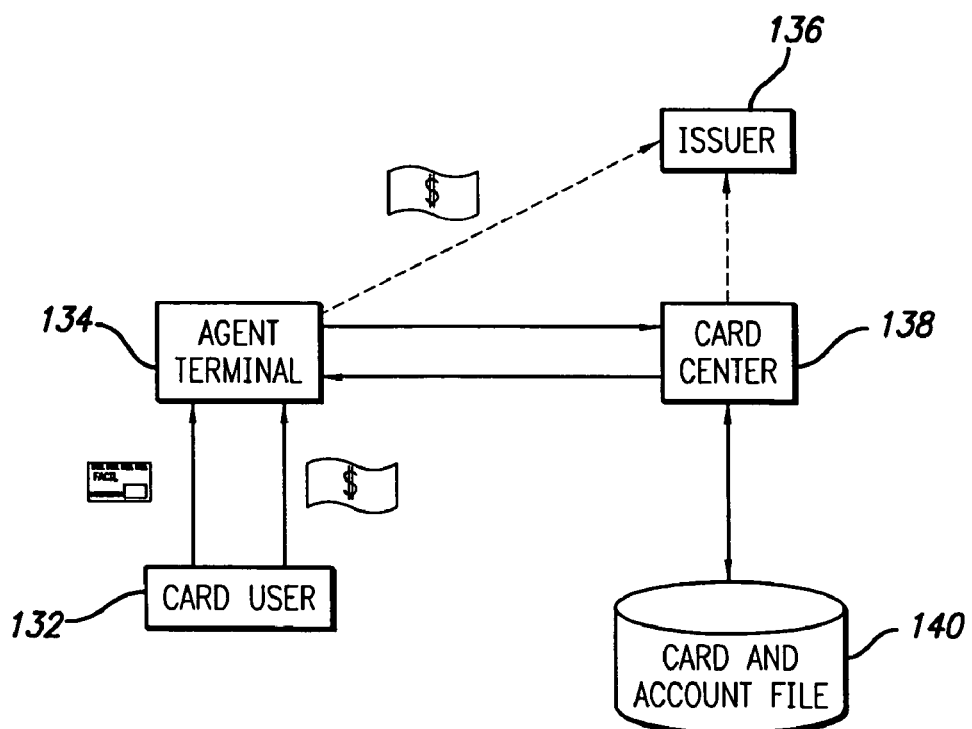
FIG. 3 is a schematic representation of a method for activating and reloading a stored value e-card system of the present invention.

The dual-card package 22 of the present invention is purchasable at a point-of-sale or point-of purchase (P.O.P) location 102. The point-of-sale location is typically a merchant providing an online link accessing an e-card financial management network. Such merchants include convenience stores, gas stations, grocery stores and department stores. The dual-card package 22 of the present invention also may be purchased at financial institutions, including banks, check cashing facilities and wire transfer establishments. All cards are distributed inactive, and may be activated when the dual-card package is purchased at the point-of-sale location. The point-of-sale location may be equipped with a terminal 134 configured to activate the e-card system when the e-card patron deposits funds into the system (FIG. 3). Cash is the financial medium of the e-card system.

The e-card financial management system of the present invention enables the e-card with a card management platform providing card inventory control, card activation and deactivation, reloadable card value, and transaction authorization and tracking. One aspect of the e-card financial management system is the link to an international financial network 100, which must be compatible with the banking and other finance laws of the country where the system is used.

In the financial systems of the present invention, withdrawal of stored value funds occurs after an e-card patron, also referred to as the load-card user, purchases a dual-card package 22. From the package the load-card user obtains the personal identification number 104. As shown in FIGS. 1 and 3, the load-card user activates the e-card account by depositing cash into the account at the point-of-sale location 106. The load-card user then sends the second transaction e-card to a debit-card user 108 and communicates the PIN to the debit-card user 110 in a manner to assure secure use of the dual-card e-card account. Upon receipt of the debit-card and PIN, the debit-card user can withdraw cash from e-card system networked cash source systems 112-116. In an alternative aspect of the present invention, the load-card user may delay activation of the e-card account until positive notification from the debit-card user that the account's PIN and debit-card has been received.

The debit-card 20 is configured so as to withdraw funds only from a networked cash source system (for example, an internationally networked ATM machine) located in a country other than where the load-card user activated the e-card system ("non-activation country"). The load-card is configured for activation, loading and reloading stored value (monetary or cash value) to the e-card system 106 and 118. With bank fund transfers, or other familiar financial wiring processes being costly and inconvenient, the debit-card user's withdrawals, according to this invention, reduces cost compared with traditional money wiring and transfer. Additionally, the e-card financial management system is linked to existing cash source networks, thereby providing added convenience to a remittance recipient or debit-card user accessing cash.

Figure 4:
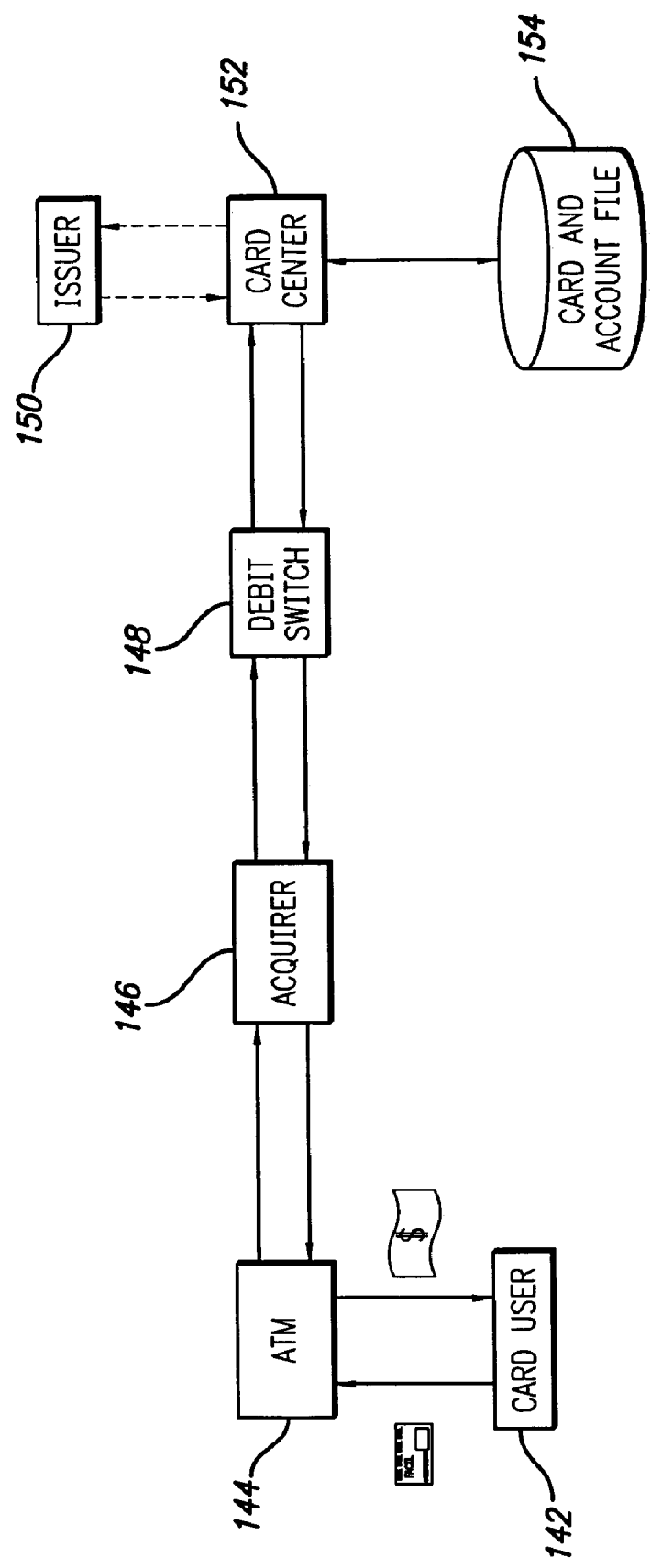
FIG. 4 is a schematic representation of a method for withdrawing cash from a stored value e-card system of the present invention.

As shown in FIG. 4, the method for withdrawing funds from the e-card account includes the debit-card user 142 locating a cash source system 144, withdrawing cash by using the second transaction e-card and entering the PIN. The e-card system acquirer 146 and card center 152 approves or denies the withdrawal 148 based on factors such as stored value balance and withdrawal activity limits according to the card and account file data base 154 and the e-card issuer 150 input. If the transaction is approved, the debit-card user receives cash, the e-card system records the transaction event and the system assesses a fee to the stored value e-card system account.

Figure 6:
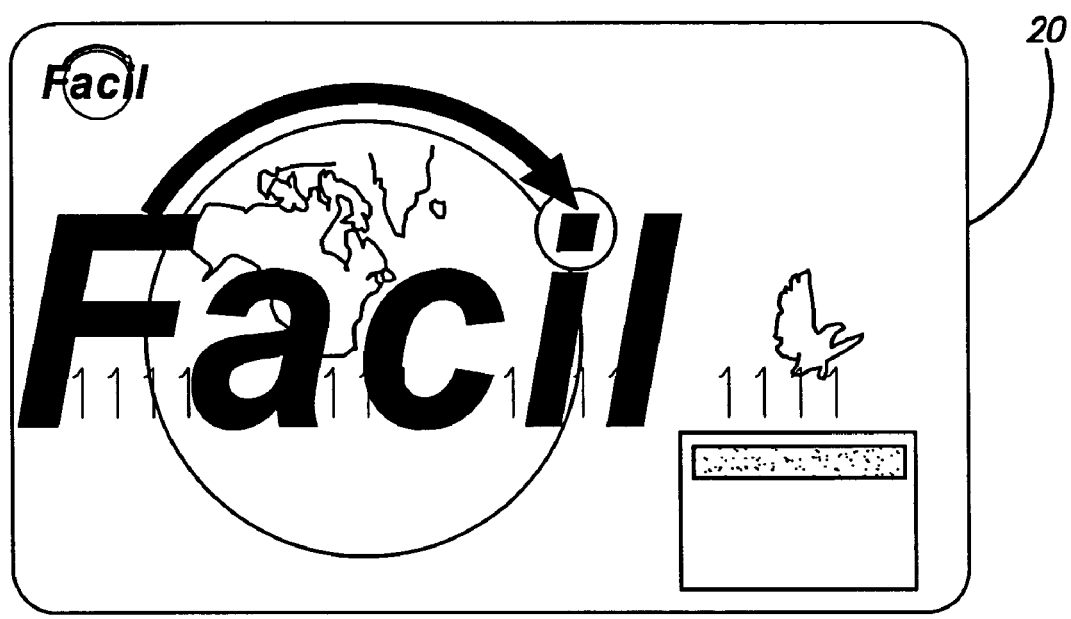
FIG. 6 depicts an e-card of the present invention.

The e-card 20 of the present invention, as depicted in FIG. 6, is configured for multiple usages by providing a reloadable option for the first e-card user (load-card user). The first e-card user reloads the e-card system account at a point-of-sale location by providing the load-card and a cash payment to the point-of-sale merchant. The merchant or the load-card holder may swipe the e-card in a magnetic card reader or otherwise enter the relevant account identification information at the point-of-sale location. The load-card user may then enter the PIN associated with the account. The merchant accesses the e-card system to enter the amount of cash paid to the merchant into the load-card user's account. Various automation schemes may be employed to facilitate reloading the stored value in the account. The first e-card holder can reload the account at any e-card system point-of-sale location within the activation country. Alternatively, the load-card user can reload the e-card system at an automated cash source system configured to receive cash payments and reload the accounts.

Figure 5:
FIG. 5 depicts a dual-card package of a stored value e-card system of the present invention.

Referring to FIG. 5, the dual-card package 22 provides a stored value financial system offering security to the e-card issuer, the point-of-sale retail vendor and the e-card holder. First, the dual-card package is distributed to the point-of-sale retail vendor unactivated, thereby preventing non-authorized persons from preactivating a card and making withdrawals from an e-card account. Secondly, the dual-card package 22 contains a special identifier or so-called "personal identification number" (PIN) that is revealed when the e-card patron scratches off the security covering 23 in the package or otherwise obtains the PIN. For example, the user may choose his or her own unique identifier through a phone, Internet or other manual or automated system. The stored value e-card system is configured so that when an account's PIN is compromised, the identity of the load-card user or debit-card user could not be used to fraudulently access other financial accounts because their identities are unknown to the stored value e-card system. In another aspect of the invention, the preferred account balance is limited to a minimum value and maximum value (for example, $20.00 U.S. to $500.00 U.S.), therein limiting the amount of potential liability if the e-card system security is breached.

Based on the foregoing, FIG. 2 shows the interrelationship between major elements of the stored value e-card system described above. The issuer 124 may be a bank or other financial institution. The card processing center 126 may be administered by the bank itself or a subsidiary or representative of the bank. The card processing center 126 is networked with a plurality of terminals 128 which may be situated in premises owned by the issuer 124, or may be situated in convenient locations such as gas stations, drug stores, and convenience stores. A number of terminals may each be attended by an agent 130, who may act on behalf of the issuer, either as an employee or as an independent contractor. Cards 122 are issued by the agent 130 to the card user 120 upon payment of funds for activation of the stored value system.

In an alternative embodiment of the stored value e-card system of the present invention, a package containing a single e-card (debit-card) can be purchased at a point-of-sale location and sent to an e-card user in a country other than that country in which the e-card is purchased and activated. The single packaged e-card can be activated at the point-of-sale location using an activation/reload code number. In such a system, the activation/reload number only permits e-card system activation and stored value account loading and reloading.

In another embodiment of the present invention, the e-card system obtains one or more of the following customer service related information regarding the e-cards (load-card and/or debit-card): where the e-card was purchased, when the e-card purchased, the purchase amount, the last transaction amount, the last transaction location, the balance of the account and the card number. An e-card user may obtain account related information at an appropriately configured point-of-sale location or a cash source system. Further, the card issuer may provide a customer service phone number or Internet system that provides account related information when the card number and PIN are input into the system. Account inquiries may subject the e-card account to system fees.

The e-card system may be configured to assess activity based fees that are automatically withdrawn from or debited to the stored value e-card system account. Activity based fees may include card purchase, card stored value load and reload, cash source system withdrawal, activation and non-activation country service fees and balance inquiry. Scheduled fees may include a monthly account fee, and dormancy account fees which are assessed after a configurable period of account inactivity.

The following is an alternative embodiment of the stored value e-card system of the present invention:

The stored value e-card system of the present invention may be a PIN-based, stored value card financial product targeting the un-banked in the United States that primarily facilitates money transfer, typically to Central and South America. Money transfer is accomplished by issuing two cards for the same account. The e-cards may be used at all Visa/MasterCard ATM and POS terminals for PIN-based activity.

The E-card Management System (EMS) enables this embodiment with a unified card management platform with the following capabilities: Card inventory control; Card activation/deactivation; Transaction authorization and tracking; Customer service; Management reporting; Information Voice Recording (IVR) interface; and, Consumer Web interface.

The following then, is an overview of the stored value e-card system of a preferred embodiment. The e-cards of a preferred embodiment are non-nominative (that is, not tied to any particular person), PIN-based Visa/MasterCard debit cards. Cards are packaged in single-card and dual-card packages with PIN(s) included in the package concealed as a scratch-off. Each card is manufactured with a unique PIN. All cards are distributed inactive and are activated at the time of card package purchase at a retail merchant equipped with a terminal configured to support the stored value e-card system product. Reloads to the card can be accomplished at appropriately equipped merchants as well. Cash is the financial medium of the E-card. However, in another aspect, to facilitate payroll deposits to a stored value e-card system, the system can allocate a single employer deposit among multiple cards. Dual-card packages enable money transfer when the package purchaser sends one card to a recipient. Customers desiring a personal debit card can obtain a single-card package. Single-card packages are also used to resolve some lost/damaged card situations as described later. Customers wanting to perform Signature and Card-Not-Present (CNP) transactions (as described below) will need to supply the stored value e-card system with name and address information. A customer can supply name and address information by calling customer service. The system maintains card inventory and will be able to confirm this information.

The following is the envisaged customer activity after acquisition, broken into the main events.

Purchasing the card: The customer selects the single or the dual-card package, and provides the merchant with cash (a configurable minimum and maximum). The merchant scans the card through the terminal and enters the amount. The system returns an 'Accept Message' signal to the terminal, which then prints a receipt (see, Receipt Content, below) and activates the card, records the transaction event, and may also assess a fee which it debits from the recorded stored value.

Withdrawing funds: The customer locates an ATM with Visa/MasterCard compatibility. The customer requests cash by swiping the card and entering the PIN. The system approves or denies the requested withdrawal based on balance and withdrawal activity limits. If approved, the customer receives cash from the ATM. The system records the transaction event, and assesses a fee if applicable.

Making a purchase at a point of service terminal: The customer locates a Visa/MasterCard Point of Service terminal that processes PIN-based purchases, swipes the card, and enters the PIN. The system approves or denies the proposed purchase based on balance and purchase/withdrawal activity limits. If approved, the purchase is completed. The system records transaction event, and assesses a fee if appropriate.

Signature-based purchase: It should be noted that the customer's name and address must be on file to perform a signature-based purchase. If so, the customer locates a Visa/MasterCard Point of Service (POS) terminal that processes signature-based purchases. The customer or merchant swipes the card, and the system approves or denies purchase based on balance and purchase/withdrawal activity limits. If approved, purchase is completed. The system records transaction event and assesses a fee if applicable.

Card-Not-Present (CNP) Purchase: Customer's name and address must be on file to perform a CNP-based purchase. The customer locates an Internet or phone order site that processes Visa/MasterCard CNP purchases. The customer gives the card number, and the associated name, and address. The system approves or denies purchase based on balance and purchase/withdrawal activity limits. If approved, the purchase is completed. The system records the transaction event, and assesses a fee if applicable.

Lost Card/Forgotten PIN: The customer calls the customer service information number, and upon connection, follows the Customer Identification Procedures. If identified, the customer service representative follows the Card Replacement Procedures. The system assesses a fee, if applicable. Alternatively, if the customer cannot be identified and correlated with an existing card, the customer must buy a new card package and loses the balance value of the lost card.

Card Doesn't Work: If damage is detected during a purchase action, the customer may select another card package, and the merchant will return the defective card. If the card is damaged after the initial purchase, the customer service representative follows the Customer Identification Procedures. If identified, the customer service representative follows the Card Replacement Procedures.

Balance Inquiry Via Web: The customer logs in to the customer service web site using the card number and PIN as the username and password. The system displays the balance and transaction history. The system logs the event and no fee is assessed.

Balance Inquiry Via Information Voice Recording: The customer calls the system information number and enters the card number and PIN. An information voice recording plays back the balance and transaction history, then logs the event and assesses a fee if applicable.

Balance Inquiry Via ATM: The customer locates an ATM with Visa/MasterCard compatibility. The customer requests the card balance by swiping the card and entering the PIN. The ATM provides the balance, logs the event, and assesses a fee if applicable.

The following are the customer identification procedures, referenced above. The customer service representative obtains the following from the customer relevant to the card of interest: Where purchased; when purchased; the purchase amount; the last transaction amount; the last transaction location; and, the card number, if known. The customer service representative then locates the customer via a custom search screen. The customer service representative enters the name and address information obtained from the customer. The customer service representative identifies and verifies the accountholders. The customer calls providing identification information for activation. The customer service representative verifies the customer identification. The customer service representative maintains records to verify the customer's identity. The customer service representative consults a list of known or suspected terrorist or terrorist organization to determine whether the customer is on the list.

The following are the card replacement procedures. The customer service representative deactivates the card of interest. For dual-card packages, the customer should know the card number of the card not lost, if only one card is lost. In one embodiment, both cards may be deactivated, but this may be unnecessary unless the second card number is not known. The customer is then instructed to purchase a single-card package and is further instructed to call back. The customer service representative identifies the customer again via the Customer Identification Procedures using information about the card being replaced along with the newly entered name and address. The customer service representative obtains from the customer the new card number, where purchased, when purchased, and the initial deposit amount. The customer service representative then links the new card to customer, which in effect transfers the balance to the new card. The system can place a full or partial hold (i.e., on the lost card balance) on the account for the customer's protection.

The following sets forth the type of fees that may be charged in a preferred embodiment. First, activity based fees may include a fee assessable for card purchase, for card reload, for card replacement, for ATM withdrawal, for ATM balance request, for Purchase (PIN, Signature, and CNP), and information voice recording (IVR) balance inquiry. Automatically assessed fees may be levied on a monthly basis, and for any dormancy that may arise after a configurable period of inactivity on the account.

The following sets forth potential management and reporting events in operating the system described. Daily reports may be posted, accessible on the web and/or emailed to management. Continuous monitoring and email alerts are posted in the event the system exceeds predetermined velocity thresholds by a particular customer or merchant.

In a preferred embodiment, the following information is maintained on each card. The card number, expiration date, CVV2, PIN (all of which are encrypted for electronic storage); retail location; date distributed to retailer; date in inventory; indicator if card is part of a dual-card package; date reported lost or stolen; status; balance; transaction history; and, inventory.

The following sets forth the content of a receipt given to the customer, subject to merchant terminal capabilities: The date and time of purchase; deposit amount; last four digits of card number; terminal number; store location; agent name; purchase or reload amount; purchase or reload fee; and, available balance.

In another alternative embodiment of the preferred invention, a stored value e-card system is configured to provide safeguards in accordance with the prevailing banking laws and anti-terrorist financing regulations by verifying the identity of an e-card account holder. As exemplified in FIG. 7, a method for activating the e-card system includes providing an e-card management system having networked point of sale locations and automated teller machine systems networked in multiple countries, step 160. An e-card patron, also referred to as the load-card user, purchases 162 a dual-card e-card package at a point of sale or point-of-purchase location. Before the PIN is revealed, stored value may be added 164 to the e-card financial account by depositing cash into the account using the first e-card or load card. The purchaser is then provided 166 with a provisional account code and is instructed to call a toll free number to approve identification before activating the e-card system.

The purchaser then calls the toll free number and provides 168 information for purposes of identification approval, which information may include name, address, telephone number, government identification in the form of social security number, passport number, matricula consular, or divers license. It will be appreciated that, alternative to a toll free call, various modes of communication may be used to provide account holder information to the card center, e.g., internet, email, written correspondence, or direct communication. Upon provision of the required information, the purchaser identity is checked 170 to the extent reasonable and practicable. If the identification is declined 172, a check is mailed back 174 to the purchaser for the amount of the initial load. If the identification is approved 176, premium e-cards may be sent 178 to the purchaser for ATM and POS use. The premium bank card provides the same services as the dual-card e-card, classic card, and more. The full service premium bank cards are configured for use at the networked automated teller machine and at point-of-purchase locations affiliated with the networked system. Premium bank cards will carry VISA/MasterCard marks along with global automated teller machine and P.O.P. marks, e.g., PLUS, Interlink or Cirrus, Maestro. Additionally, upon identification approval 176, the e-card system is activated 180 and the purchaser is provided with a PIN.

As exemplified in FIG. 3, the issuer 136 may maintain records of the information used to verify a purchaser's identity, including name, address, and other identifying information, and may consult lists of known or suspected terrorists or terrorist organizations provided to financial institutions by the government to determine whether a person seeking to open an account appears on such list. The information verification records may be maintained in an e-card account file database 140 for periodic account audits, as required by the finance laws and regulating agencies.

Figure 7:
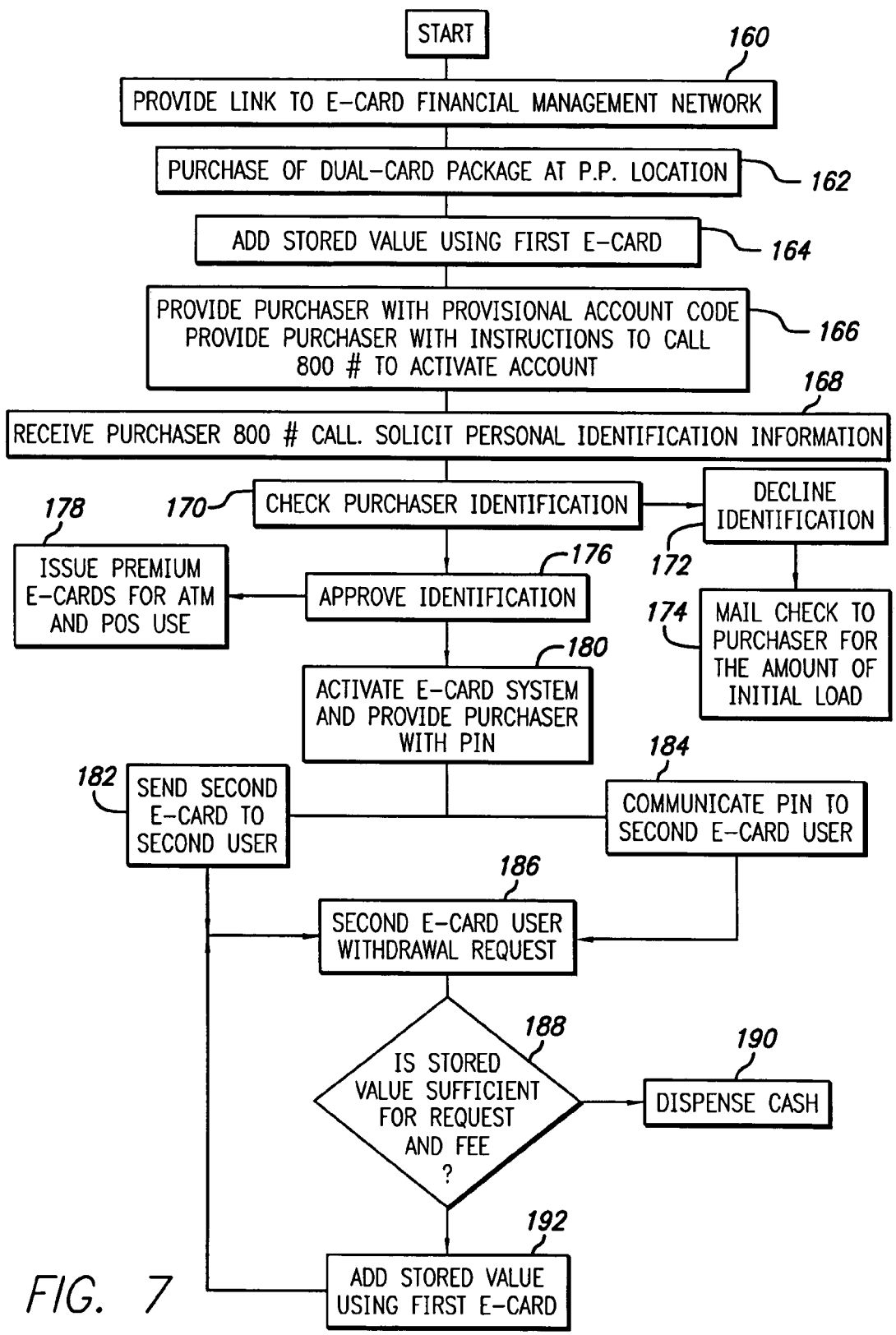
FIG. 7 is a flow diagram of an e-card financial management system of the present invention further depicting customer identification and verification steps.

Continuing with reference to FIG. 7, from this point onward use of the e-card system is as before. The second e-card may be sent 182 to the second user, and the PIN number may be communicated 184 to the second e-card user. The second e-card holder may then request 186 a withdrawal at an appropriate ATM. If there is sufficient stored value in the e-card system 188, the second e-card user may withdraw cash 190 using the second card and the PIN. If there is insufficient stored value, the first e-card holder may be notified, and he may add 192 stored value using the first e-card. Upon replenishment of the stored value, the second e-card holder may draw down the balance until replenishment is again required.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A stored value e-card system, comprising:
   an e-card financial management network having automated teller machine systems networked in multiple countries;
   a dual-card package purchasable at a point of sale location, the package including a first transaction card and a second transaction card, the transaction cards having a personal identification number;
   wherein the financial management network is configured such that, upon an initial fund deposit being made to an agent of the financial management network by a user of the first card, the stored value e-card system can be activated at the point of sale location;
   wherein the financial management network is configured to allow, upon activation, cash withdrawal through the automated teller machine systems; and wherein:
   the stored value e-card system is reloadable by the first card user after the initial fund deposit has been made; and
   the financial management network is configured so that cash withdrawal can be made only in a country other than the country in which the e-card system was activated.

2. The stored value e-card system of claim 1, wherein the financial management network is configured such that, of those countries in which the e-card network has automated teller machines, the e-card system is capable of being activated in only one predetermined country and in no other country.

3. The stored value e-card system of claim 2, wherein the financial management network is configured to allow cash withdrawal from an automated teller machine when the second card together with the personal identification number is provided to the automatic teller machine.

4. The stored value e-card system of claim 1, wherein the financial management network is configured to permit the e-card system to be reloaded with funds through an automated teller machine when the first card together with the personal identification number is provided to the automated teller machine.

5. The stored value e-card system of claim 1, wherein the financial management network is configured to permit the e-card system to be reloaded with funds at a point of sale location when the first card together with the personal identification number is presented at the point of sale location.

6. The stored value e-card system of claim 1, wherein the financial management network is configured to activate the e-card system without prior identification of the first card user or the second card user.

7. The stored value e-card system of claim 1, wherein the financial management network is configured not to activate the e-card system without prior identification of the first card user or the second card user.

8. The stored value e-card system of claim 1, further comprising a stored value account for storing a value associated with deposited funds.

9. A dual-card stored value system, comprising:
   an e-card management network having an automated teller machine system networked in multiple countries;
   a dual-card package purchasable at a point of sale location, the dual-card package including a first transaction card and a second transaction card, the transaction cards having a personal identification number;
   means for activating the stored value system with the first transaction card in a first country; and
   means, using the second transaction card, to withdraw cash from the networked automated teller machine system in a second country different from the first country;
   wherein the management network is configured not to permit withdrawals upon presentation of the first card, but only upon presentation of the second card.

10. The dual-card stored value system of claim 9, wherein the means for activating the stored value system includes the financial management network which is configured to perform at least the following steps:
    receiving the first transaction card;
    receiving a cash deposit; and
    adding stored value to the dual-card stored value system.

11. The dual-card stored value system of claim 9, wherein the means for withdrawing cash includes the management network which is configured to perform the following steps in the second country:
    receiving the second transaction card;
    receiving the personal identification number;
    checking the second card against the personal identification number;
    checking the stored value credited to the dual-card stored value system; and
    dispensing cash as requested, not exceeding the stored value.

12. The dual-card stored value system of claim 9, wherein the management network is configured not to activate the stored value system without prior verification of the first card user's identity.

13. The dual-card stored value system of claim 9, wherein the management network is configured to activate the stored value system without prior verification of either the first card user's or the second card user's identity.

14. The stored value e-card system of claim 9, further comprising a stored value account for storing a value associated with funds deposited to the e-card system.

15. A method for activating a dual-card e-card system for cash withdrawal in a foreign country, comprising:
    providing an e-card financial management system having networked automated teller machine systems in at least two different countries;
    purchasing at a point of sale location in a first country a dual-card e-card package having a first transaction card and a second transaction card, the transaction cards having a personal identification number and being operable within the networked automated teller machine system;
    activating the e-card system at the point of sale location by depositing cash to an agent for the financial management system for adding stored value to the e-card system;
    forwarding the second transaction e-card to a second card user;
    communicating the personal identification number to the second card user to thereby enable the second card user to use the second transaction card to withdraw cash at a networked automated teller machine located in a second country different from the first country; and configuring the management network so as not to permit withdrawals upon presentation of the first card, but only upon presentation of the second card.

16. The method of claim 15, wherein activating the e-card includes:

verifying the identity of the first card user from information provided by the first card user;

consulting a list of known or suspected terrorists or terrorist organizations to determine whether the first card user is on the list; and maintaining records of the information provided by the first card user.

17. The method of claim 15, further comprising storing in an account of said e-card system a value associated with funds deposited to the e-card system.

18. A method for activating a dual-card e-card management system having networked automated teller machines systems in at least two countries for cash withdrawals, comprising:

in a first country, purchasing a dual-card e-card package having a first transaction card and a second transaction card, the transaction cards having a personal identification number and being operable within the networked automated teller machine system;

prior to providing the personal identification number to the first card user, loading value to the dual e-card at the point of sale by depositing cash to an agent of the e-card management system;

provisionally activating the e-card system;

verifying the identity of the first card user from information provided by the first card user;

consulting a list of known or suspected terrorists or terrorist organizations to determine whether the first card user is on the list;

approving the identity of the first card user;

permanently activating the dual card system, providing the personal identification number to the first card user;

maintaining records of the information provided by the first card user;

forwarding the second transaction e-card to a second card user;

communicating the personal identification number to the second card user to thereby enable the second card user to use the second transaction card to withdraw cash at a networked automated teller machine in a second country different from the first country; and configuring the management network so as not to permit withdrawals upon presentation of the first card, but only upon presentation of the second card.

19. The method of claim 18, further comprising storing in an account of said e-card system a value associated with funds deposited to the e-card system.

20. A dual-card stored value system, comprising:

an e-card management network, the e-card network having automated teller machine systems networked in multiple countries;

a dual-card package purchasable at a point of sale location, the dual-card package including a first transaction card and a second transaction card, the transaction cards having a personal identification number and being operable in the e-card management network;

means for provisionally activating the e-card system with the first transaction e-card in a first country;

means for approving the identity of a first transaction e-card user for permanently activating the e-card system; and means for withdrawing cash using the second transaction e-card from the networked automated teller machine system in a second country;

wherein the management network is configured not to permit withdrawals upon presentation of the first card, but only upon presentation of the second card.

21. The dual-card stored value system of claim 20, wherein the means for provisionally activating the e-card system includes a management network configured to perform at least the following steps:

receiving a cash deposit at the point of sale location;

verifying the identity of the first card user; and approving the identity of the first card user against a government list of known or suspected terrorists or terrorist organizations.

22. The dual-card stored value system of claim 20, wherein the means for withdrawing cash is configured to perform at least the following steps:

providing the second transaction e-card to a second card user in a country different from the first country; and communicating the personal identification number to the second card user, thereby enabling the second card user is to use the personal identification number and the second transaction card to withdraw cash at the networked automated teller machine system.

23. The dual-card stored value system of claim 20, wherein the means for permanently activating the e-card system is configured to perform at least the following steps:

receiving a communication from the first card user;

verifying identification information from the first card user;

comparing the identification information against a government list of known or suspected terrorists or terrorist organizations;

approving the identity of the first card user; and issuing a full service premium bank card for point of sale use and automated networked teller machine use.

24. The stored value system of claim 20, further comprising a stored value account for storing a value associated with funds deposited to the e-card system.

25. A stored value e-card system, comprising:

a dual-card package purchasable at a point of sale location, the package including a first transaction card and a second transaction card, the transaction cards having a personal identification number; wherein when an initial fund deposit is made to an agent of a financial management network by a user of the first card, a stored value e-card system is activated at the point of sale location; and cash withdrawal through automated teller machine systems is made with the second transaction card; and wherein the stored value e-card system is reloadable by a user of the first card, after the initial fund deposit has been made; and the financial management network is configured not to permit withdrawals upon presentation of the first card, but only upon presentation of the second card.

* * * * *